United States Patent [19]
Voren

[11] Patent Number: 5,542,375
[45] Date of Patent: Aug. 6, 1996

[54] EGG INCUBATION SYSTEM AND METHOD

[76] Inventor: Howard J. Voren, 1538 E Rd., Loxahatchee, Fla. 33470

[21] Appl. No.: 410,691

[22] Filed: Mar. 27, 1995

[51] Int. Cl.⁶ .................................................. A01K 31/00
[52] U.S. Cl. ........................................................ 119/312
[58] Field of Search .................................... 119/311, 312, 119/314, 302, 303; 237/4, 8 R, 15

[56] References Cited

U.S. PATENT DOCUMENTS

| | | | |
|---|---|---|---|
| 193,490 | 7/1877 | Davis | 119/312 |
| 985,964 | 3/1911 | Zimmer | 119/312 |
| 3,148,649 | 9/1964 | Moore et al. | 119/312 |

*Primary Examiner*—Gene Mancene
*Assistant Examiner*—Thomas Price
*Attorney, Agent, or Firm*—Carroll F. Palmer

[57] ABSTRACT

An improved system for the incubation of exotic bird eggs contains a flexible bladder as an essential component. The system includes an incubation unit, system heat exchange liquid, a heating unit to warm the heat exchange liquid, a pump unit, and conduits to circulate warmed heat exchange liquid in the system. The incubation unit includes a housing, a bed of soft wood chips or equivalent bedding material contained within the housing upon which an array of the bird eggs is supported. The flexible bladder has a relatively flat bottom portion that is supported by and covers the array of bird eggs. Inlet and outlet tubes extend from the bladder and are associated with the conduits whereby warmed system heat exchange liquid may be circulated from the heating unit through the bladder interior to supply heat through the flat bottom portion to the bird eggs to warm and incubate them. A related method of bird egg incubation based on the bladder is also disclosed.

8 Claims, 2 Drawing Sheets

5,542,375

EGG INCUBATION SYSTEM AND METHOD

BACKGROUND OF THE INVENTION

1. Field of the Invention

This application relates to improvements in egg incubation. More particularly, it concerns incubation of exotic bird eggs and a new system and method for conducting such incubations.

2. Description of the Prior Art

Equipment for the artificial incubation of bird eggs has been extensively explored, particularly with regard to chicken eggs since a massive volume of such eggs are daily incubated and hatched on a large commercial basis. The associated work has concentrated on two aspects of such large scale incubation, namely control of humidity and egg handling as shown by the following list of U.S. Pat. Nos.: 1,827,530, 2,864,336, 3,829,507, 2,021,479, 3,147,737, 4,378,758, 2,026,801, 3,148,649, 4,706,608, 2,334,865, 3,225,740, 5,025,619.

The present invention provides new improvements in incubation of exotic bird eggs that critically improve the percentage of hatch relative to what has been attainable heretofore in such operations.

OBJECTS

A principal object of the invention is the provision of new improvements in the incubation of exotic bird eggs.

A further object is the provision of a new system and method for conducting incubation of exotic bird eggs that critically improves the percentage of hatch relative to what has been attainable heretofore in avicultural operations.

Another object is the provision of a system and method for incubation of exotic bird eggs that eliminates the need for close attention to and control of humidity.

An additional object is improvements in the economics of aviculture and operation of exotic bird aviaries.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by using a flexible heat exchange bladder as an essential element of new incubation systems and methods for warming and incubating bird eggs, particularly exotic bird eggs, e.g., parrot eggs. This new discovery makes it possible to raise the hatch rate in some species of exotic bird egg incubations from only about 50% using current state of the art incubators to a hatch rate of 90% or more using the new systems and methods of the invention.

Incubation units of the invention include (a) a housing means, (b) a bed of particulate material contained within the housing means upon which are supported (c) an array of bird eggs covering a given area of the bed, (d) a flexible bladder having a liquid holding interior and a relatively flat bottom portion of larger area than the area of the egg array.

The flat bottom portion of the bladder is laid over and rests upon the egg array while inlet and outlet tubes, communicating with the liquid holding interior and associated with the conduit means, permit warmed system heat exchange liquid to be circulated from the heating means through the bladder interior to supply heat through its flat bottom portion to the bird eggs to incubate them.

The flexible bladders useable in accordance with the invention may take a variety of shapes and forms, e.g., flat rectangular, square, hexagonal, hemispherical etc. provided it is defined by the flat bottom portion. Preferably, the bladder has a bottom portion of orthogonal shape, a spaced apart flat top portion that mimics the bottom portion in area and side portions that integrally join the bottom portion to the top portion with the liquid holding interior in between.

The bladders are preferable fabricated of flexible plastic or elastomeric sheet material, e.g., vulcanized rubber, plasticized polyvinyl chloride film, polyethylene and polypropylene films, but any other suitable flexible sheet materials may be used. Such bladders may be structured in a variety of ways to provide various flow paths of heat exchange liquid across the flat bottom of the bladder.

In preferred embodiments of the invention, at least a portion of the flexible bladder is covered with animal fur or equivalent synthetic fabric as insulation material or to form a contact surface with the incubating eggs.

Water is a preferred heat exchange material for the new incubation systems, but any other suitable liquid used as a heat exchange material, e.g., ethylene and propylene glycols, etc., may be used.

Preferred materials for use as the bedding support for the incubation eggs are soft wood shavings and mung beans, but any other particulate material, e.g., natural and synthetic fibers and filaments, sawdust, or like materials, that will form a soft, formable bed for the bird eggs may be used.

The housing for the new systems may be made in various shapes and dimensions as well as forms a variety of materials of construction, e.g., wood, metal, plastic, etc. Such housings may contain a single bladder or be of size to accommodate two or more bladders with a single bedding area or multiple related bedding areas within the housing.

Advantageously, the new system includes control means for controlling the temperature of the system heat exchange liquid and such control means may additionally control operation of the pump means.

The new incubation systems are particularly useful for incubation of exotic bird eggs, especially parrot eggs, but may also be used for chicken eggs or like high volume, food source type eggs.

A new method for the incubation of bird eggs in which eggs are warmed by contact with a heat transfer member made possible by the discovery of the utility of heat exchange bladders in bird egg incubations.

A method for incubation of bird eggs in accordance with the invention comprises (1) providing a horizontal array of a plurality of bird eggs, (2) laying the flat bottom portion of a flexible bladder upon the array so the bladder is supported thereon and (3) circulating warmed heat exchange liquid through the bladder to transfer heat therefrom through the flat bottom portion to the eggs and thereby incubate them.

In preferred methods of the invention the warmed heat exchange liquid has a temperature between about 99° and 103° F. and especially between 99.5° and 101.5°. Also, the array of bird eggs is supported upon a bed of particulate material and the bird eggs are turned periodically during the incubation, e.g., manual turning in random fashion so that a cooler portion of each egg will face upwardly toward the system bladder.

One feature of the invention is that special means or steps for control of humidity about the incubation eggs is not required, in contrast to state of art bird egg incubation equipment and procedures. Thus the new systems and methods of the invention may be successfully used under typical room ambient temperature and humidity conditions without recourse to special provisions for controlled spatial temperature and humidity values.

BRIEF DESCRIPTION OF THE DRAWINGS

A more complete understanding of the invention can be obtained by reference to the accompanying drawings in which.

DESCRIPTION OF THE PREFERRED EMBODIMENTS

For a detailed description of the invention, reference is made to the drawings in which generic parts of the illustrated matter are indicated by arrowhead lines associated with the designation numerals and specific parts are indicated with plain lines associated with the numerals.

Figure 1:
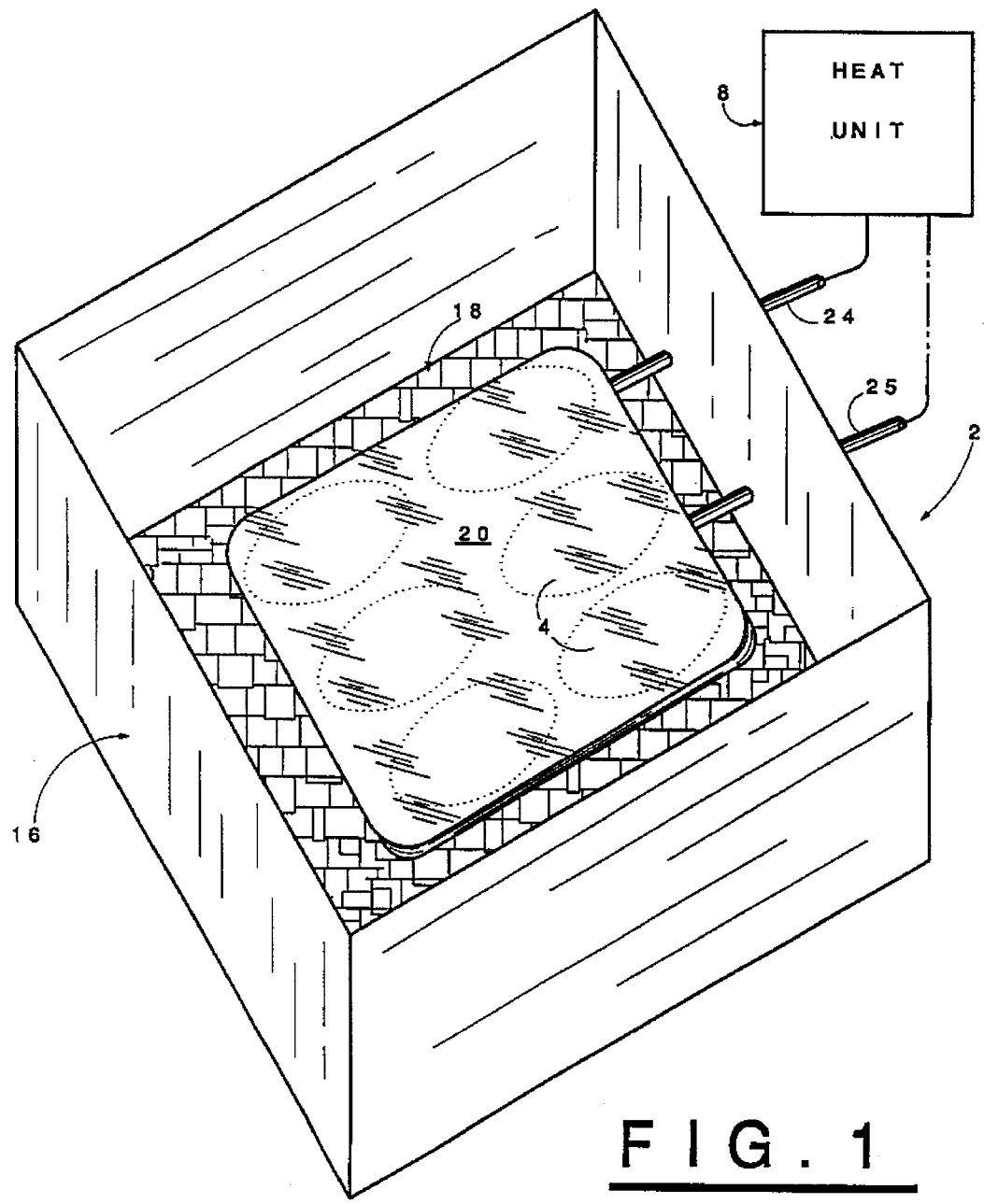
FIG. 1 is an isometric view of an incubation unit of an exotic bird incubation system in accordance with the invention.
Figures 4, 5:
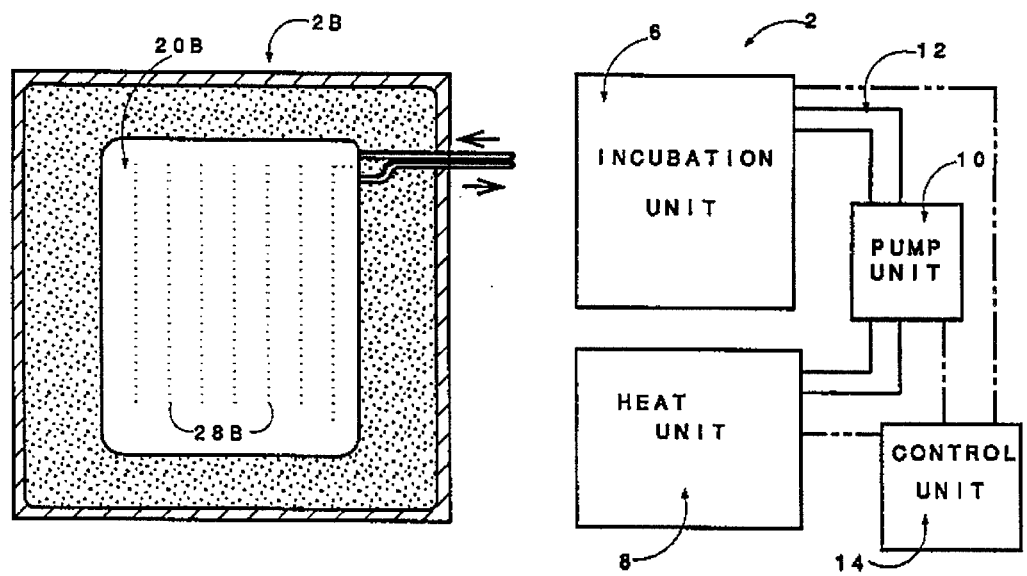
FIG. 4 is a plan view of yet another embodiment of an incubation unit of the invention.
FIG. 5 is a schematic drawing of an incubation system in accordance with the invention.

With initial reference to FIGS. 1 and 5, the improved system 2 of the invention for the incubation of bird eggs 4 (shown in outline in some drawings) comprises an incubation unit 6, system heat exchange liquid (not shown), heating unit 8 to warm the system heat exchange liquid, pump unit 10 and conduit means 12 to circulate the warmed system heat exchange liquid via the pump unit 10 between the incubation unit 6 and the heating unit 8.

The system 2 also includes control unit 14 for controlling the temperature of the system heat exchange liquid and may additionally control operation of the pump unit 10.

The incubation unit 6 includes a housing 16 with a bed 18 therein of particulate material, e.g., wood shavings. An array of bird eggs 4 is supported on the bed 18 covering a given area of thereof.

A flexible bladder 20 having a liquid holding interior 22 and a relatively flat bottom portion 23 of larger area than the egg array area lays over and rests upon the array of bird eggs 4.

Inlet tube 24 and outlet tube 25 communicate with the bladder interior 22 and are associated with the conduit means 12 so warmed system heat exchange liquid may be circulated from the heating unit 6 through the bladder interior 22 to supply heat through the flat bottom portion 23 to the bird eggs 4 to incubate them.

Figures 2, 3:
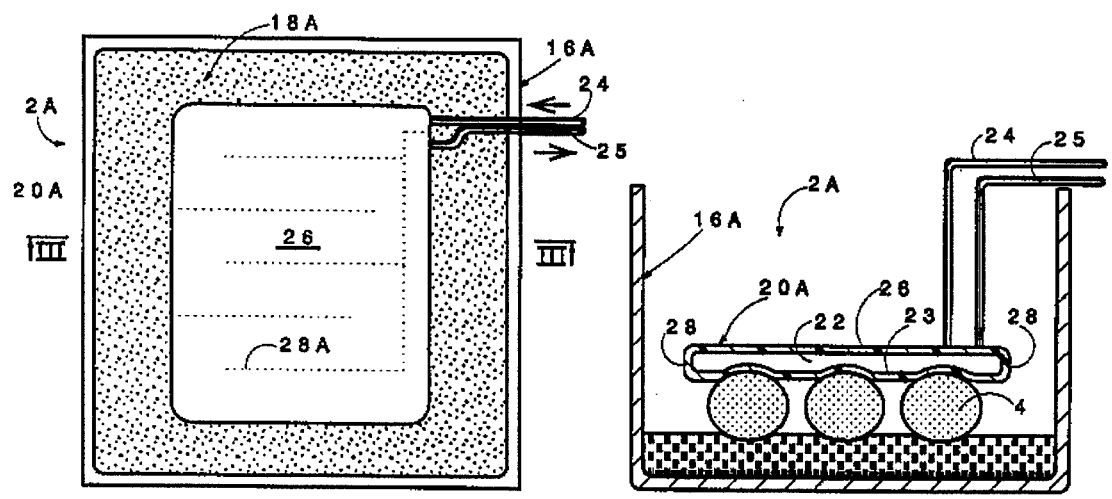
FIG. 2 is a plan view of another embodiment of an incubation unit of the invention.
FIG. 3 is a sectional view of the incubation unit taken on the line III—III of FIG. 2.

With reference to FIGS. 2 & 3, the system 2A comprises housing 16A containing a bed 18A of mung beans. The flexible bladders 20A are defined by the flat bottom portion 23 of rectangular shape, an spaced apart flat top portion 26 that mimics the bottom portion in area and side portions 28 integrally joining the bottom portion 23 to the top portion 26 with the liquid holding interior 22 in between. As shown by dotted lines, the bladder 20A is constructed, e.g., by thermal welding of lines of contact 28A of top portion 26 to bottom portion 23, so that the interior 22 has cascading channels therein for distributed flow of heat exchange liquid.

FIG. 4 shows the system 2B with a bladder 20B having weld lines 28B dividing its interior into parallel channels for distributed flow of heat exchange liquid therein.

The new incubation systems 2, 2A & 2B of the invention make possible the incubation of exotic bird eggs at critically higher hatch rates then have been possible using prior known incubation exotic bird egg incubations, typically 90% hatch rate as opposed to 50% in some of the more difficult species.

According to the invention, a horizontal array of a plurality of bird eggs 4 is arranged on a bed of wood shaving 18, mung beans 18A, or the like. Then, the flat bottom portion 23 of a flexible bladder 20 or 20A is laid upon such array so the bladder is supported thereon whereupon warmed heat exchange liquid is circulated from heat unit 8 through the bladder to transfer heat through the flat bottom portion 23 to the eggs 4 to incubate them.

Typically, the warmed heat exchange liquid has a temperature between about 99° and 103° F., especially 99.5° to 101.5°. Also, the bird eggs are manually turned periodically during the incubation so that a cooler part of each egg will replace a warmer part directly facing the bladder bottom portion 23.

The embodiments of the invention in which an exclusive property or privilege is claimed are defined as follows:

1. An improved system for the incubation of bird eggs which comprises:

an incubation unit, a system heat exchange liquid, a heating means to warm said system heat exchange liquid, a pump means, and a conduit means to circulate said warmed system heat exchange liquid via said pump means between said incubation unit and said heating means, said incubation unit including, a housing for containing an array of bird eggs, a bed of particulate material contained within said housing which is adapted to support said array of bird eggs covering a given area of said bed, a flexible bladder having a liquid holding interior and a relatively flat bottom portion of larger area than said given area adapted to be laid over and resting upon said array of bird eggs and inlet and outlet tubes communicating with said liquid holding interior and connected to said conduit means whereby said warmed system heat exchange liquid may be circulated from said heating through said liquid holding interior to supply heat through said flat bottom portion to said bird eggs to incubate them.

2. The system of claim 1 which additionally comprises control means for controlling the temperature of said system heat exchange liquid.

3. The system of claim 2 wherein said control means additionally controls operation of said pump means.

4. The system of claim 1 wherein said system is adapted to incubate exotic bird eggs.

5. The system of claim 4 wherein said system is adapted to incubate parrot eggs.

6. The system of claim 1 wherein said particulate material is soft wood shavings.

7. The system of claim 1 wherein flexible bladder is defined by said flat bottom portion of orthogonal shape, an spaced apart flat top portion that mimics said bottom portion in area and side portions integrally joining said bottom portion to said top portion with said liquid holding interior in between.

8. The system of claim 7 wherein said bladder is formed of elastomeric or plastic film.

* * * * *